United States Patent [19]

Harms

[11] 3,735,051

[45] May 22, 1973

[54] DIGITAL INFORMATION STORAGE UNIT HAVING PARALLEL STORES AND A CONTROL THEREFOR

[75] Inventor: David Christopher Harms, Beeston, England

[73] Assignee: Plessey Handel Und Investments A.G., Zug, Switzerland

[22] Filed: Oct. 1, 1971

[21] Appl. No.: 185,561

[30] Foreign Application Priority Data

Oct. 2, 1970 Great Britain....................46,873/70

[52] U.S. Cl.............................................179/18 EB

[51] Int. Cl.............................................H04q 3/42

[58] Field of Search..................................179/18 EB

[56] References Cited

UNITED STATES PATENTS 3,347,993 10/1967 Warman et al. ..................179/18 EB 3,627,954 12/1971 Quinn..............................179/18 ES 3,600,521 8/1971 Plank et al.......................179/18 EB

*Primary Examiner*—Thomas W. Brown

*Attorney*—Alex Friedman et al.

[57] ABSTRACT

A digital information storage unit which has a particular but not necessarily an exclusive application in an electronic telecommunication exchange system includes at least two stores arranged for parallel and substantially independent operation and a control unit for controlling the operation of the stores. When a digital information signal is applied to the storage unit input it is channelled to one of the stores, the other store is connected to the input and said one store is inhibited for a period determined by the signal storage period. When both stores are occupied the input is inhibited until one of the stores is cleared, the cleared store being connected to the input. During the storage period the information is processed through three stages of control and the store whose contents is to be processed is selected in dependence upon the nature of the stored information. Before each stage of control the progress of the information can be inhibited in dependence on the nature and time of arrival of the information.

11 Claims, 2 Drawing Figures

DIGITAL INFORMATION STORAGE UNIT HAVING PARALLEL STORES AND A CONTROL THEREFOR

Figure 1:
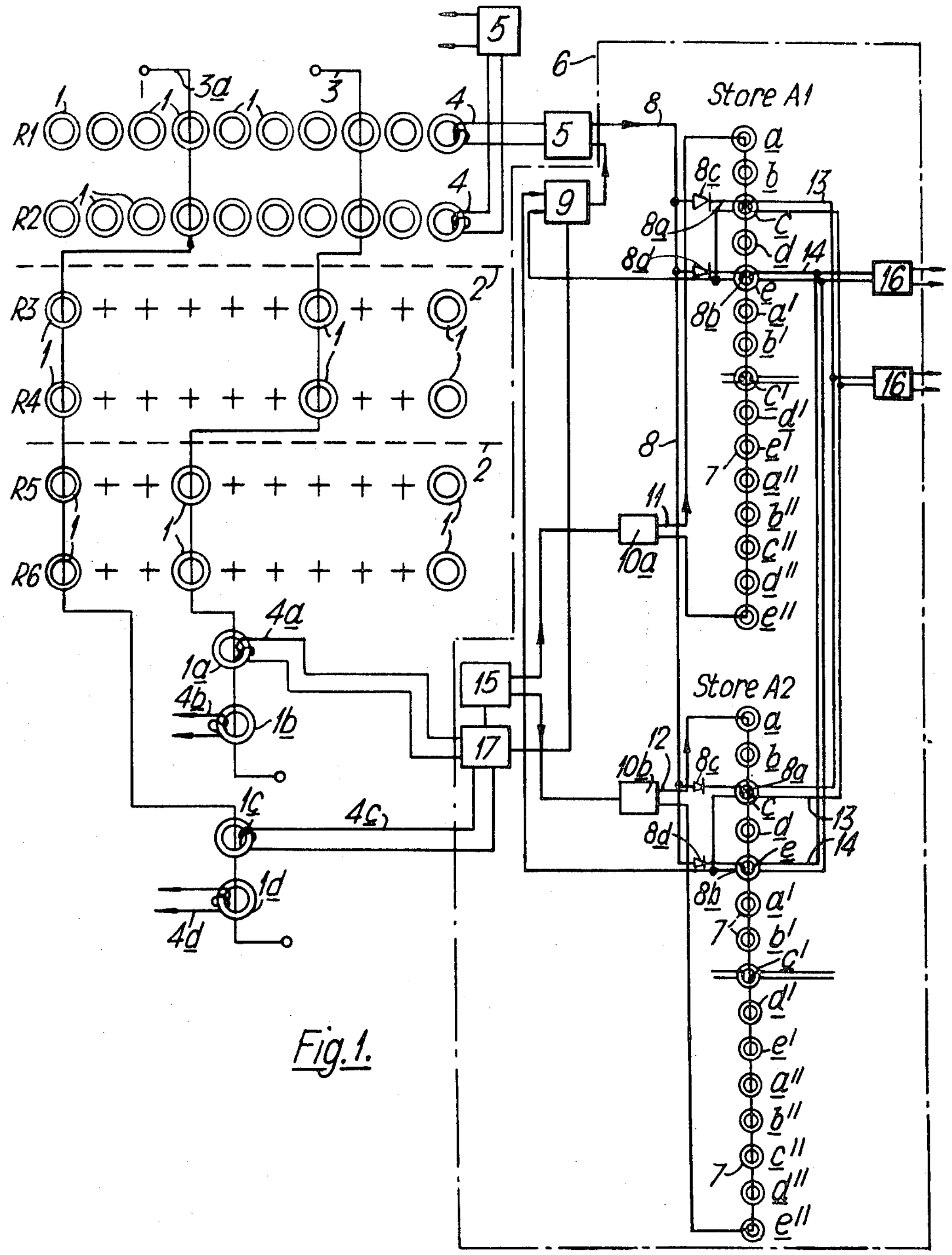

The invention relates to an information storage unit having a particular but not necessarily an exclusive application in an electronic telecommunication exchange system.

In systems, for example, an electronic telecommunication exchange system, where received information has to be stored prior to its utilization within the system, the frequency at which the information can be applied to the system is directly related to its storage capacity.

For example, in an electronic telecommunication exchange system wherein the provision of a speech path between a subscribers' line and the supervisory equipment is effected by cross-point switches, and the selection and setting up of the speech path is effected by common control equipment, i.e., equipment which is used in turn by each call passing through the system and which is duplicated in order to minimize the risk of failure in the event of a fault, it is necessary for a subscriber's line circuit or an incoming junction supervisory relay set which is associated with an incoming call for almost the whole of its duration, to be identifiable as soon as it is seized to enable connection of the required speech path to it. This is achieved by generating and storing the calling number as soon as the equipment i.e. the line circuit or relay set is seized. When a subscriber's handset is lifted, or an incoming junction supervisory relay set is seized, a current pulse is applied to a calling number generator which generates a digital information signal that represents the calling subscriber's directory number or the identifying number of the seized relay set. The digital information signal is applied to a storage unit wherein it is stored until a register is connected thereto to take over the number storage function. The current pulse also provides control signals for the calling number storage unit and in the case of incoming calls a priority signal.

The digital information stored in the storage unit is cleared very rapidly to the register and in practice, the functioning of the calling number generator and storage unit facility is such that two calls arriving in quick succession can be handled if, and only if, a second call arrives more than one tenth of a millisecond after the first call. If the second call arrives within this one tenth of a millisecond period then it is lost.

It is an object of the present invention to provide an information storage unit which can accept information at a higher frequency than known information storage units.

The invention provides an information storage unit which includes at least two stores arranged for parallel and substantially independent operation; and a control unit for effecting control of the operation of the stores, the control being such that, during the storage period, stored information is processed through three stages of control which indicate at a first stage that information is awaiting processing in at least one of the stores and once at this stage for a predetermined period of time, the stored information cannot be lost, at a second stage that information in one of the stores will be processed next, and at a third stage that information in one of the stores is being processed, the control unit including first means for channelling a first information signal applied to an input of the storage unit to one of the two stores, and connecting the other one of the two stores to the input of the storage unit to facilitate the channelling thereto of a second information signal, the said one store being inhibited for a period of time determined by the required storage period of the first information signal; second means for inhibiting the input to the storage unit when both stores are occupied, the inhibit being removed on clearance of one of the two stores thereby facilitating the channelling of the next information signal that is applied to the storage unit input to the cleared store by the first means; third means for controlling the selection of the store whose content is to be processed in dependence upon the nature of the stored information; and fourth means for inhibiting the progress of the information before each of the three stages of control in dependence upon the nature and time of arrival of the information.

According to a feature of the invention, an information storage unit as outlined in the preceding paragraph is provided which also includes a further store that is connectable to the output or outputs of each one of the two stores, the information signals on being cleared from any one of the two stores are, prior to being connected to the output or outputs of the storage unit, applied to, and stored within, the further store.

Figure 2:
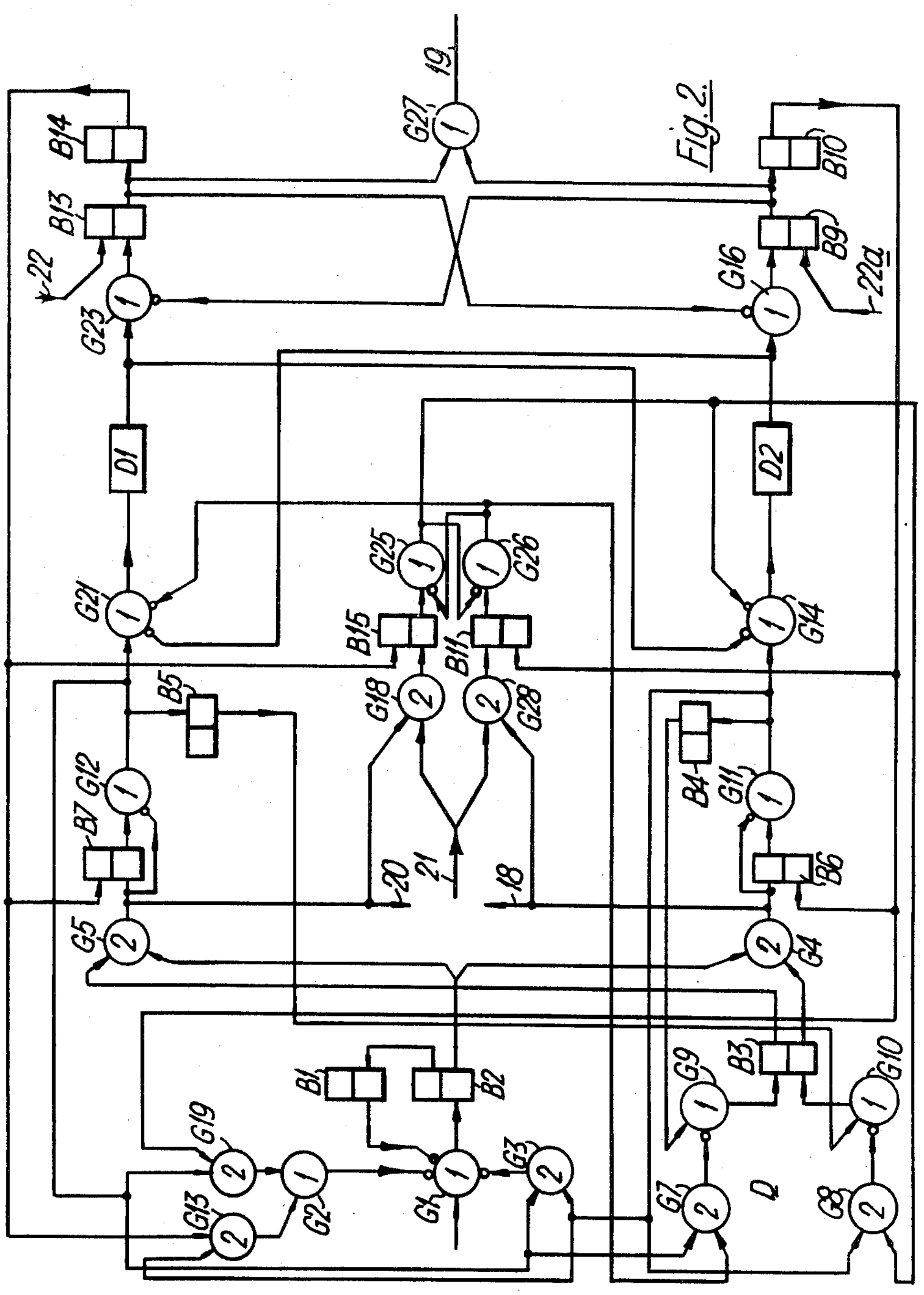

The foregoing and other features according to the invention will be better understood from the following description with reference to the accompanying drawings, in which:

FIG. 1 diagrammatically illustrates a calling number generator and a calling number storage unit for an electronic telecommunication exchange system, and FIG. 2 illustrates a logic diagram of a storage control unit for the calling number storage unit according to FIG. 1.

The information storage unit outlined in a preceding paragraph has, as previously stated, a particular application in an electronic telecommunication exchange system for example, an exchange system of the kind known by the Registered Trade Mark 'Pentex' and for this application the storage unit is utilized to store digital information that represents a calling subscriber's directory number of an identifying number of seized incoming junction supervisory relay set. The storage unit is, for this application, known as a calling number storage unit, and it is, therefore, convenient to describe the invention in this context.

A calling number generator and a calling number storage unit for an electronic telecommunication exchange system are diagrammatically illustrated in FIG. 1 of the accompanying drawings and the calling number generator includes a number of linear-response metal tape cores 1 arranged in rows and columns. In the illustrated arrangement there are six rows R1 to R6, each one of which contains ten cores, and the rows of cores R1 to R6 are shown divided into three groups of two rows R1/R2, R3/R4, R5/R6 by the chain dotted lines 2. The significance of this arrangement will become evident from the subsequent description.

The cores 1 are threaded, for each subscriber of the exchange system and each incoming junction supervisory relay set, with a wire such as the wires 3 and 3*a*, the cores threaded by each of the wires being indicative of the number i.e. directory or equipment, of the subscriber or incoming junction supervisory relay set with which the wire is associated. Each group of two rows is associated with one digit of a number that can be generated, therefore, with the illustrated arrangement it is possible to generate a three-digit number. Thus, if the number to be generated is a three-digit one, and each digit is expressed in a one-out-of-ten code, the wire must thread one core of one row of each group of rows, i.e. three cores in all. However, the calling number generator is what is termed 'common equipment' i.e. it is equipment that is used by each call in turn, and it is found necessary, in practice, to duplicate this equipment in order to ensure continuity of service in the event of component failure. This duplication results in the provision of the six rows R1 to R6 of ten cores i.e. two rows per digit group, and the need for each wire for example the wire 3, to thread a total of six cores i.e. two cores per digit group.

To simplify threading, each wire passes only once through each of the required cores and constitutes a one turn primary winding for the cores which act as transformers. Each core has a multi-turn, for example 100 turn, secondary winding 4, connected to a separate amplifier 5 which, on receipt of a calling pulse applied to a wire that threads the associated core, generates an amplified output pulse.

The outputs of the amplifiers 5 associated with the cores of the rows R1, R3, and R5 are applied to a calling number storage unit (enclosed by a chain dotted line 6 in FIG. 1), and the outputs of the amplifiers 5 associated with the cores of the duplicated rows R2, R4 and R6 are applied to another calling number storage unit (not illustrated) which is a duplication of the illustrated storage unit and which, for the reasons outlined in a preceding paragraph, is provided to ensure continuity of service in the event of component failure in the illustrated storage unit.

In order to obtain the previously mentioned control and priority signals for the calling number storage unit, each of the wires, for example the wire 3, associated with the subscribers line circuit is threaded through additional cores i.e. the cores 1*a* and 1*b* for the quoted example and each of the wires, for example the wire 3*a* associated with the incoming junction supervisory relay sets is threaded through additional cores i.e. the cores 1*c* and 1*d* for the quoted examples. Multi-turn secondary windings 4*a* and 4*c* respectively of the cores 1*a* and 1*c* are connected to the calling number storage unit 6, and multi-turn secondary windings 4*b* and 4*d* respectively of the cores 1*b* and 1*d* are connected to the said another calling number storage unit. The signals generated at the secondary windings 4*a*, 4*b*, 4*c* and 4*d*, on receipt of a calling pulse applied to a wire that threads the respective cores are used, in a manner to be subsequently outlined, as control and priority signals for the storage units.

The calling number storage unit 6 includes two ferrite core stores A1 and A2 which each consist of a column of ferrite cores 7 that are, in practice, of the order of 2 millimeters in diameter. The ferrite material from which the cores 7 are constructed has a so called 'square-loop' characteristic which in effect means that the cores can normally exist in one of two magnetized states; the state of a ferrite core 7 can be changed by passing a current pulse along a wire threaded through the core.

In the illustrated arrangement there are fifteen of the cores 7 for each of the stores A1 and A2. These cores are arranged in three groups of five cores, the five cores of each group being indicated by the references *a* to *e*, $a^1$ to $e^1$, and $a^{11}$ to $e^{11}$ respectively. Each group of five cores is associated with one digit of a number to be stored, and, therefore, a digit can, with this arrangement, be stored in say a two-out-of-five code. Each of the ferrite cores 7 of the stores A1 and A2 has an input winding, such as the windings 8*a* and 8*b* for the cores 7*c* and 7*e* respectively, and an output winding, such as the windings 13 and 14 for the cores 7*c* and 7*e* respectively.

The storage is effected by connecting the output of each of the amplifiers 5 which is representative of a digit of the number to be stored and expressed in a one-out-of-ten code to an input of the storage unit 6, each of the inputs of the storage unit being connected to one side of the input windings of two of the ferrite cores 7 of each of the stores A1 and A2. For example, the windings 8*a* and 8*b* of each of the stores A1 and A2 are each connected at one side to an input of the storage unit by means of a wire 8. The other side of the input windings 8*a* and 8*b* of the store A1 are connected to one input of a two input selection unit 9 and the other side of the input windings 8*a* and 8*b* of the store A2 are connected to the other input of the selection unit 9. Each of the input windings of the ferrite cores 7 can be connected to more than one input of the storage units, therefore, an isolation diode, such as the diodes 8*c* and 8 *d* is interposed between an input winding and each of one of the input terminals with which it is associated.

The operation of the selection unit 9 is controlled, in a manner to be subsequently outlined, by a control unit 17, the inputs of which are connected to the secondary windings 4*a* and 4*c* of the cores 1*a* and 1*c* of the calling number generator. Thus, the pairs of input windings 8*a* and 8*b* are connected in parallel and a current pulse generated by an amplifier 5 is passed along the associated wire, i.e. the wire 8 and causes the state of the cores 7*c* and 7*e* of either the store A1 or the store A2 to be changed, the store whose cores have their state changed is selected by the selection unit 9 in a manner to be subsequently outlined.

The outputs of the amplifiers 5 are termed "write" pulses since they "write" a digit of the calling number into the store i.e. they change the magnetic state of the cores through which the pulse carrying wire is threaded.

Read-out pulse generators 10*a* and 10*b* are respectively connected at their outputs to read-out windings 11 and 12 which are respectively threaded through the cores 7 of the stores A1 and A2. The generators 10*a* and 10*b* generate, on demand, pulses of the opposite polarity to the polarity of the pulses generated by the amplifiers 5. Thus, a pulse generated by say the generator 10*a* will cause a current pulse to be passed along the winding 11 and any of the cores 7 whose state has been changed by an output pulse of an amplifier 5, for example, the cores 7*c* and 7*e* of the stores A1, will be switched back to their normal state thereby causing an output pulse to be generated in output windings, such as the windings 13 and 14 of the switched cores.

The input to each of the generators 10*a* and 10*b* is connected to a selection unit 15 which selects, in a manner to be subsequently outlined, which one of the generators 10*a* and 10*b* is to deliver the store 'readout' pulse. The input of the selection unit 15 is connected to an output of the control unit 17 which controls its operation.

The output winding of corresponding cores of each of the stores A1 and A2 are connected in parallel and each pair of windings is connected to a separate output amplifier 16. The circuit of each of the amplifiers 16 includes a switching unit, for example a silicon controlled rectifier (S.C.R.) which is switched to one of its two states in response to the input pulses from the switched cores 7, and remains in this state until the stored information is transferred to a register.

The ferrite core store information is, therefore, erased by the application of a 'read-out' pulse from a read-out pulse generator 10*a*, 10*b* thereby leaving the store free to accept other information, and the switching units of the amplifiers 16 act as intermediate stores until the previously mentioned register is connected to the storage unit output.

The two stores A1 and A2 are, therefore, arranged for parallel operation and the control of the stores is arranged such that the stores are capable of substantially independent operation thereby allowing maximum use of the available storage. The control unit for effecting control of the operation of the stores A1 and A2 or the two duplicated stores in the event of component failure in the stores A1 and A2, can be realized from any suitable components, therefore, it is depicted in FIG. 2 of the drawings in the form of a logic diagram.

When a call is originated i.e. from a subscriber's line circuit or an incoming junction supervisory set, a current pulse is applied to the associated wire of the calling number generator and the signals generated in the secondary windings of the threaded cores are in the case of the windings 4 of the cores 1 applied to the associated amplifiers 5 and in the case of the windings 4*a* and 4*c* of the cores 1*a* and 1*c* applied to the control unit 17 which channels the outputs of the associated amplifiers 5 to one of the ferrite core stores A1 and A2. This is effected by switching the associated selection units 9 to connect one of their two inputs i.e. the inputs associated with the selected store, to their output and thereby to the amplifiers 5, and completion of this circuit results in the state of those cores 7 of the selected stores that are threaded by the output wire of the associated amplifiers to be changed.

The manner in which the control unit 17 effects these and other operations will be evident from the following description in relation to FIG. 2 of the drawings.

Referring to FIG. 2, the signal applied to the control unit 17 which is generated as a result of a subscriber's handset being lifted, is connected to the input of an OR gate G1 and in the absence of an output from either an OR gate G2, a two-input AND gate G3, or a monostable device B1 which would, if present, inhibit the operation of the gate G1, the gate G1 delivers an output signal which is applied to one side of a monostable device B2. On receipt of the output signal from the gate G1, the monostable device B2 causes an output pulse having a duration of the order of 9 to 15 $\mu$s to be applied from one side thereof to one input of two-input AND gates G4 and G5, and from the other side thereof i.e. the trailing edge of the 9 – 15 $\mu$s pulse, to one side of the monostable device B1.

The 9 to 15 $\mu$s pulse delivered by the monostable device B2 indicates that a call has been received and the application of the trailing edge of the pulse to the monostable device B1 results in this device applying an inhibit pulse of a minimum duration of 120 $\mu$s to the input gate G1.

In the electronic telecommunication exchange system previously referred to, the calling pulses that are applied to the associated wires of the calling number generator, are each generated by a contact of an electrical relay. The bounce characteristics of the relay that is utilized are such that a calling pulse of sufficient magnitude to produce outputs from at least some of the amplifiers 5 will be generated a significant period after the generation of the first pulse. It is, therefore, not possible to accept a further call during this bounce period due to the possibility of mutilated numbers being generated. The operation of the gate G1 is, therefore, inhibited for this 120 $\mu$s period immediately after a call is received. A distributor, which is indicated generally in FIG. 2 by the reference D, and which is channelling the call to one of the two stores A1, A2 (see FIG. 1), operates within a period of 15 $\mu$s from the receipt of the calling signal and ensure that the next call that is received is channelled to the other one of the two stores. A call received in the 9 to 15 $\mu$s period previously mentioned results in itself and the previous call being lost since both these calls will be passed to the same store. However, after the 9 to 15 $\mu$s period and in the absence of subsequent calls in the period, the first received call cannot be lost since the input gate G1 will have been inhibited. Calls received during this 120 $\mu$s inhibition period will, therefore, also be lost.

The distributor D comprises two-input AND gates G7 and G8, two-input OR gates G9 and G10, and a bistable device B3. The output of the gates G7 and G8 are respectively connected to one input of the OR gates G9 and G10, the other input of each of the OR gates G9 and G10 being respectively connected to the outputs of monostable devices B4 and B5. The output of each of the gates G9 and G10 is connected to a separate one of the inputs of the bistable device B3 whose outputs are each connected to the other input of a separate one of the gates G4 and G5, the output of the bistable device B3 associated with the gate G10 being connected to the input of the gate G4. The inputs to the distributor, as applied to the inputs of the gates G7 and G8, and its operation will be discussed in subsequent paragraphs.

It will be assumed, by way of example, that the two-input AND gate G4 is associated with the store A1, that the two-input AND gate G5 is associated with the store A2, and that the distributor D is channelling the first received call to the store A1 i.e. the bistable device B3 is such that it is delivering an output signal to the gate G4 but not to the gate G5.

Thus, under these conditions, the delivery of output pulses from the devices B2 and B3 will result in the operation of the gate G4 for the 9 to 15 $\mu$s period previously mentioned. The gate G4 will, therefore, deliver a 9 to 15 $\mu$s output pulse which is applied to one side of a bistable device B6, to one input of an OR gate G11 to inhibit its operation for the 9 to 15 $\mu$s period, to one input of a two-input AND gate G28 which forms part of a control circuit to be subsequently outlined for incoming junction calls, and to the selection units 9 (see FIG. 1) via the output lead 18 to instruct these units to connect the outputs of the appropriate amplifiers 5 to the store A1 i.e. the information received by the calling number generator is passed to store A1 for storage.

In the absence of an input signal to the other side of the bistable device B6, this device, on receiving the 9 to 15 $\mu$s pulse from the gate G4, delivers an output pulse to the other input of the gate G11 which operates at the end of the previously mentioned inhibition period to deliver an output signal which is representative of a first stage of control and is used, in a manner to be subsequently outlined, to indicate that store A1 is engaged. The output of the gate G11 is applied to one side of the monostable device B4 thereby causing it to operate and deliver an output pulse, for example of 10 μs duration. The output of the gate G11 is also applied to one input of the gate G8, to one input of the gate G3, to one input of a two-input AND gate G13, and to one input of an OR gate G14, and the functioning of these gates, on receipt of this output signal, will be subsequently outlined.

The 10 μs output pulse of the monostable device B4 is applied to the gate G9 which operates to apply an output signal to the bistable device B3 causing it to change state and thereby remove the signal from the input of the gate G4 and apply a signal to the other input of the gate G5. An output from the monostable device B2 associated with a subsequent call will thus cause the gate G5 to operate and, therefore, the call will be channelled to the store A2.

A bistable device B7, an OR gate G12 and the monostable device B5 respectively performing the same functions in association with a call being channelled to the store A2 as the device B6, gate G11 and device B4 when a call is channelled to the store A1, the gate G10 being utilized in association with the output of the device B5 to change the state of the device B3 in order to channel the next call to the store A1.

An output lead 20 is utilized in association with the store A2 in the same manner as the output lead 18 is utilized for the store A1, in that it ensures that the selection units 9 connect the amplifiers 5 to the store A2 i.e. it effects the opening of the store A2 for acceptance of the information which is being generated in the calling number generator.

The gates G9 and G10 are allowed to operate only in the absence of an output respectively from the gates G7 and G8 and since only one input is applied to each of the gates G8 and G7 i.e. from the outputs of the gates G11 and G12 respectively, the gates cannot operate and, therefore, the distributor D operates to channel a subsequent call to one of the stores not currently being utilized. The other input to each of the gates G8 and G7, as will subsequently be seen, is only obtained when an incoming junction call is applied to the storage unit. It will be assumed for the moment that incoming junction calls are absent.

The application of the output of the gate G11 to the gate G14 causes the gate G14, in the absence of inhibit signals at its other inputs, to operate and deliver an output signal to one side of a delay device D2. The device D2 then delivers, at the end of a delay period, an output signal which is representative of a second stage of control and is used, in a manner to be subsequently outlined, to indicate that the stored information of store A1 is to be processed next, and which is applied to one input of an OR gate G16. The gate G16 will operate, in the absence of an inhibit signal, and deliver an output signal to one side of a bistable device B9 which will, therefore, operate and deliver an output signal to one side of a monostable device B10, to one input of an OR gate G27 thereby causing it to operate, and to one inhibit input of an OR gate G23 which is associated with the store A2, thereby inhibiting its operation for reasons to be subsequently outlined. The period of the delay device D2 is arranged such that a read-out pulse is not applied to read-out winding 11 of the store A1 before the write pulses applied to the input windings of the cores 7 have decayed to zero.

The operation of the OR gate G27 causes it to deliver an output on the lead 19 which, in practice, is connected to a selection circuit (not illustrated) of a telecommunication exchange system, the selection circuit being utilized to choose a free register for connection to the calling number store i.e. to the outputs of the amplifiers 16, so that the stored information can be passed thereto.

The device B10, on receipt of the output signal from the bistable device B9, which is representative of a third stage of control and is used, in a manner to be subsequently outlined, to indicate that the stored information of store A1 is being processed, will operate and deliver an output pulse of a duration, for example 20 μs, at least equal to the period of time required to read-out the contents of the store A1 into the intermediate store.

The output of the device B10 is applied to the bistable device B6 thereby causing it to change its state and render the gate G11 inoperative. This will, therefore, cause the signals at the first and second stages of control of the store A1 to be removed. The output of the device B10 is also applied to one side of a bistable device B11 which forms part of the incoming junction call control circuitry.

Thus, operation of the device B10 causes, by operation of the bistable device B6, the control signals associated with the store A1 to be cleared.

The OR gates G21 and G23 and the bistable device B13, the monostable device B14, and the delay device D1 respectively perform the same functions in association with a call being channelled through the second and third stages of control of the store A2 as the gates G14 and G16 and the devices B9, B10 and D2 when a call is being channelled through these stages of control in the store A1.

A call, therefore, passes through three main stages of control during processing which indicate that (a) a call is waiting in store A1 (or A2), (b) the call in store A1 (or A2) will be the next call to be processed, and (c) the call in store A1 (or A2) is being processed. If it is assumed that a call has been received and channelled by the distributor D to the store A1 and that this call has, at least, reached the first stage of control, then a second call arriving at the storage unit would, as previously stated, be channelled to the store A2. The second call will then, in a manner as previously outlined, proceed to the first stage of control in the store A2, and, therefore, under these conditions, the resulting outputs of the gates G11 and G12 which respectively indicate that the stores A1 and A2 are engaged, will both be applied to the AND gate G3 thereby causing it to operate and apply a signal to an inhibit input of the gate G1. This signal inhibits the operation of the gate G1 and prevents further calls from being accepted thereby ensuring that the calls already received are not lost or interfered with.

The output of the gate G12 is also applied to the gate G19 and when a call is being read out from store A1, the output of the device B10 is also applied to the gate G19, therefore, under these conditions, this gate will operate and apply a signal to one input of the gate G2 causing it to operate and apply a signal to another inhibit input of the gate G1. This inhibit signal will, therefore, inhibit the operation of the gate G1 and prevent further calls from being accepted. The gate G13 functions in a similar manner to the gate G19 when a call is being read out of the store A2 and a second call has, at least, reached the first stage of control in store A1.

The application of this inhibit to the gate G1 is necessary since as previously stated, the output of either the device B10 or the device B14 will render either the gate G11 or the gate G12 inoperative and thereby remove one input from the gate G3 resulting in a release of the inhibit imposed on the gate G1 by the gate G3. This in effect means that whilst both stores are occupied, the gate G1 is inhibited during the first and second stages of control of the stores by the output of the gate G3 and is inhibited during the third stage of control of one of the two stores by either the gate G13 or G19 in association with the gate G2.

The control unit 17 is such that it can discriminate between the signals that are generated on the secondary windings 4*a* and 4*c* in a manner such that priority is given to the signal generated, as a result of an incoming supervisory set being seized, on the secondary winding 4*c*.

The signal applied to the control unit 17 which is generated as a result of an incoming junction supervisory set being seized is connected to the input of the gate G1 and to an input lead 21, which is connected to one input of two two-input AND gates G18 and G28. The signal applied to the gate G1 is treated in the same manner previously outlined for subscriber originated calls in that it is channelled through either the gate G4 or the gate G5 by the distributor D.

It will be assumed by way of example that the distributor D is such that the incoming junction call has been channelled to the store A2, therefore, under these circumstances, the gate G5 will have operated and an output signal will have been applied to the output lead 20 to open the store A2. This output signal is also applied to the other input of the gate G18, thereby causing it to operate and deliver an output signal which is applied to one side of a bistable device B15. The gate G28 will not operate due to the absence of an output from the gate G4. As previously stated, the other side of each of the bistable devices B7 and B15 are connected to the output of the monostable device B14, therefore, if the contents of the store A2 are being read out at the instant the outputs are generated by the gates G5 and G18, the devices B7 and B15 will not operate and the incoming junction call will not be allowed to proceed to the first stage of control of the store A2 and would, therefore, be lost. This situation can, however, not exist in practice provided the distributor D is functioning correctly. If a call is being channelled to the store A2 then a call must have been received by the store A1 and be at least at the first stage of control of this store. The output of the gate G11 will, therefore, be applied to the gate G13 as is the output of the monostable device B14. Under these conditions, the gate G13 in association with the gate G2 will inhibit the operation of the gate G1 and prevent the call referred to in the preceding paragraph from being accepted.

Thus, in the absence of a call being read out of the store A2, the devices B7 and B15 will operate and deliver output signals which are respectively applied to the OR gate G12 and an OR gate G25. They will thus pass to the first stage of control and in the absence of an inhibit on the gate G21 to the second stage of control of the store A2. If there is a call at the second stage of control for store A1 then the output of the device D2 will have been applied to the inhibit input of the gate G21 thereby inhibiting its operation and preventing the output of the gate G12 from passing to the second stage of control.

The gate G25 will deliver an output in the absence of an inhibit signal being applied thereto from an OR gate G26 which forms part of that section of the incoming junction call control circuitry that is associated with the store A1. The output of the gate G25 is applied to another inhibit input of the OR gate G14 thereby inhibiting the operation and preventing the output of the gate G11 from passing to the second stage of control. The progress of any call at store A1 that was at the second stage of control and set to be processed next is, therefore, inhibited by the output of the gate G25 and the incoming call in store A2 will take priority over any call in store A1 in that it will be the next call to be processed and the call in store A1 will be moved back to the first stage of control.

The removal of the output of the delay device D2 removes an inhibit from the gate G21 and, therefore, a signal applied to the input of the gate G21 causes the gate to operate and apply a signal to a delay device D1 which will, at the end of a delay period, deliver an output signal which is applied to one input of the gate G23; the gate G21 is inhibited if the gate G26 has operated thereby preventing the output of the gate G12 from passing to the second stage of control. Assuming that the gate G26 is inoperative then the device D1 will deliver an output signal which is applied to the gate G23 which will only operate if its inhibit input is absent. The output of the device D1 is also applied to the inhibit input of the gate G14 thereby preventing any call at the first stage of control at the store A1 from proceeding to the second stage of control i.e. removing the input from the device D2 and thereby the inhibit input to the gate G21. This will, therefore, establish continuity of connection between the gate G5 and the gate G23.

The output of the gate G25 is also applied to the OR gate G26, thereby inhibiting its operation and preventing a second concurrent incoming junction call from taking priority over the first received incoming junction call. If the gate G26 was allowed to operate on recipt of the second incoming junction call then it would deliver an output pulse to the gate G21 which would inhibit the progress of the call at store A2 in the same manner as the call in store A1, therefore, neither call would be allowed to progress to the read out condition i.e. the third stage of control. The output of the gate G25 is further applied to one input of the gate G8 which will operate if there is a call at store A1 and it has reached at least the first stage of control. Operation of the gate G8 will inhibit the operation of the OR gate G10 and prevents operation of the distributor D i.e. under a priority condition for the incoming junction call, the output of the distributor is maintained in the gate G5 thereby ensuring that the next call is directed to the store A2.

The gate G23 will be inhibited if a call is being processed at the store A1 i.e. it has reached the third stage of control. An external clearance signal which is generated when a register has been selected and connected to the amplifier 16 of the store whose contents are being read out, is connected to the bistable devices B9 and B13 respectively via leads 22*a* and 22 and will, when generated, result in the signal applied to the device B14 (or B10) and the gate G27 being removed and the call in the store whose contents are not being read out from progressing to the third stage of control. The clearance signal is removed when read-out is completed. On clearance of the inhibit to the gate G23 it will operate and deliver an output signal to the bistable device B13 which will then function in a manner as previously outlined for the gate B9 and cause the gate G27 and the device B14 to operate, the outputs of these devices being utilized in a manner as previously outlined to operate the register selection circuits and produce the necessary inhibits.

It can, therefore, be seen from the foregoing that during processing a call passes through three main stages of control which indicate at a first stage that information is awaiting processing, and once at this stage for a predetermined period of time the stored information cannot be lost, at a second stage that information in one of the stores will be processed next, the store which is selected being dependent upon the nature i.e. whether incoming or subscriber originated calls, of the information stored therein, and at a third stage that the information in one of the stores is being processed. The progress of the information is inhibitable before each of the three stages of control depending upon the nature and time of arrival of the information or call.

When an incoming junction call arrives at one of the stores it takes priority over any subscriber originated call waiting at the second stage of control of the other store. The incoming junction call then waits at the second stage of control and the other call is moved back to the first stage of control. It should, however, be noted that incoming junction calls to one of the stores cannot take priority over another incoming junction call already at the second stage of control of the other store.

It should also be noted that whilst two ferrite-core stores A1 and A2 have been described and illustrated, the invention should not be considered as being limited to the use of two stores. It is possible, in applications other than telecommunication exchange systems, for the storage unit to use more than two stores provided that they are arranged for parallel and substantially independent operation, and that the appropriate sections of the control circuitry are provided for the additional stores and suitably cross-connected with the other control circuitry to introduce the necessary inhibits and inter-related functioning. It will of course be appreciated that the number of stages of control will have to be increased since the number of control stages is directly related to the number of stores used. In practice, there is one more stage of control than the number of stores used. This ensures that information in each store is at a different stage of control to information in each of the other stores and that the stored information is processed in turn, priority can of course be given to information of a special nature.

It is to be understood that the foregoing description of specific examples of this invention is made by way of example only and is not to be considered as a limitation in its scope.

What is claimed is:

1. An information storage unit which includes at least two stores arranged for parallel and substantially independent operation; and a control unit for effecting control of the operation of the stores, the control being such that, during the storage period, stored information is processed through three stages of control which indicate at a first stage that information is awaiting processing in at least one of the stores and once at this stage for a predetermined period of time, the stored information cannot be lost, at a second stage that information in one of the stores will be processed next, and at a third stage that information in one of the stores is being processed, the control unit including first means for channelling a first information signal applied to an input of the storage unit to one of the two stores, and connecting the other one of the two stores to the input of the storage unit to facilitate the channelling thereto of a second information signal, the said one store being inhibited for a period of time determined by the required storage period of the first information signal; second means for inhibiting the input to the storage unit when both stores are occupied, the inhibit being removed on clearance of one of the two stores, thereby facilitating the channelling of the next information signal that is applied to the storage unit input to the cleared store by the first means; third means for controlling the selection of the store whose content is to be processed in dependence upon the nature of the stored information; and fourth means for inhibiting the progress of the information before each of the three stages of control in dependence upon the nature and time of arrival of the information.

2. An information storage unit as claimed in claim 1 which also includes a further store that is connectable to the output or outputs of each one of the two stores, the information signals on being cleared from any one of the two stores are, prior to being connected to the output or outputs of the storage unit, applied to, and stored within, the further store.

3. An information storage unit as claimed in claim 1 wherein each one of the two stores is a ferrite core store which includes a number of ferrite cores that are independently switchable between two magnetized states; an input and an output winding for each of the ferrite cores, the input and output windings of corresponding ferrite cores of each of the two stores being connected in parallel; and a read-out winding which is threaded through each of the ferrite cores.

4. An information storage unit as claimed in claim 3 wherein each pair of parallel connected input windings are connected at one end to one side of at least one input of the storage unit via a diode, wherein the other end of one winding of each pair of windings is connected to an input of a first selection unit, the other end of the other one of the pair being connected to another input of the first selection unit, and wherein the output of the first selection unit whose operation is controlled by the controlled unit is connected to the other side of the storage unit input.

5. An information storage unit as claimed in claim 4 wherein the storage unit inputs are divided into groups, each group of inputs being associated with one bit of the information to be stored, and wherein each input is connected to a number of the pairs of parallel connected input windings via the associated first selection unit.

6. An information storage unit as claimed in claim 3 which includes a pulse generator for each one of the two stores, the output of each generator being connected to the read-out winding of the associated store; and a second selection unit, the input of each of the pulse generators being connected to a separate output of the second selection unit whose operation is controlled by the control unit.

7. An information storage unit as claimed in claim 1 wherein the first means includes first and second two input AND gates which are each associated with a separate one of the two stores, the control unit's input being connected to one input of each of the first and second AND gates via one input of a first OR gate and one side of a first monostable device, the output of each of the first and second AND gates effecting the channelling of an information signal to the associated one of the two stores; a second monostable device, one side of which is connected between the output of the other side of the first monostable device and an inhibit input of the first OR gate; a distributor unit having two outputs which are each connected to the other input of a separate one of the first and second AND gates; first and second bistable devices, the input of one side of each one of which is connected to the output of a separate one of the first and second AND gates; second and third OR gates, one input of each one of which is connected to the output of the said one side of a separate one of the first and second bistable devices and an inhibit input of each one of which is connected to the output of that one of the first and second AND gates which is associated with the same store, the output of each of the second and third OR gates being connected to separate ones of first inputs of the distributor unit via a third monostable device, and to separate ones of second inputs of the distributor unit.

8. An information storage unit as claimed in claim 7 wherein the distributor unit includes a third bistable device the output of each side of which is associated with a separate one of the two stores and connected to a separate one of the two outputs of the distributor unit; fourth and fifth OR gates the output of each one of which is connected to a separate one of the inputs of the third bistable device, one input of each of the fourth and fifth OR gates being connected to a separate one of the first inputs of the distributor unit; and third and fourth two input AND gates, the output of each one of which is connected to an inhibit input of a separate one of the fourth and fifth OR gates, one input of each of the third and fourth AND gates being connected to a separate one of the second inputs of the distributor unit whilst the other inputs thereof are each connected to separate ones of first outputs of the third means.

9. An information storage unit as claimed in claim 7 wherein the second means include a fifth two input AND gate, the output of which is connected to another inhibit input of the first OR gate, each of the two inputs of the fifth AND gate being connected to the output of a separate one of the second and third OR gates; sixth and seventh two input AND gates one input of each one of which is connected to the output of a separate one of the second and third OR gates whilst the outputs thereof are each connected to a separate one of the inputs of a sixth OR gate, the output of the sixth OR gate being connected to a further inhibit input of the first OR gate; and fourth and fifth monostable devices which are each associated with a separate one of the two stores and which each have one side thereof connected between the third stage of control of the associated store and another input of that one of the sixth and seventh AND gates whose other input is connected to the output of that one of the second and third OR gates associated with the other store, the input of the other side of each of the first and second bistable devices being connected to the output of the said one side of that one of the fourth and fifth monostable devices which is associated with the same store.

10. An information storage unit as claimed in claim 9 wherein the third means include eight and ninth two input AND gates which are each associated with a separate one of the two stores, one input of each one of which is connected to the output of that one of the first and second AND gates which is associated with the same store whilst the other inputs thereof are connected together and to another input of the storage unit; fourth and fifth bistable devices, the input of one side of each one of which is connected to the output of a separate one of the eighth and ninth AND gates whilst the inputs of the other sides thereof are each connected to the output of the said one side of that one of the fourth and fifth bistable devices which is associated with the same store; seventh and eighth OR gates, an input of each one of which is connected to the output of the said one side of a separate one of the fourth and fifth bistable devices whilst the outputs thereof are each connected to an inhibit input of the other one of the seventh and eighth OR gates, and to separate ones of the first outputs of the third means; and ninth and tenth OR gates, an input of each one of which is connected to the output of a separate one of the second and third OR gates whilst the outputs thereof are each connected via a delay device to the second stage of control of the store associated with that one of the second and third OR gates to which its input is connected, the output of each of the seventh and eighth OR gates being connected to an inhibit input of that one of the ninth and tenth OR gates which is associated with a different one of the two stores.

11. An information storage unit as claimed in claim 10 wherein the fourth means include a connection between the output of each of the delay devices and another inhibit input of that one of the ninth and tenth OR gates which is associated with a different one of the two stores; eleventh and twelfth OR gates an input of each one of which is connected to the output of a separate one of the delay devices whilst the outputs thereof are each connected via one side of a bistable device to the third stage of control of the store associated with that one of the delay devices to which its input is connected, the other side of the bistable device being connectable to a clearance signal source, an inhibit input of each one of the eleventh and twelfth OR gates being connected to the third stage of control of the store associated with the other one of the eleventh and twelfth OR gates.

* * * * *